June 8, 1926.

J. L. MORGAN 1,587,735

CAR AXLE JOURNAL BEARING

Filed June 18, 1923      2 Sheets-Sheet 1

INVENTOR.
J. L. MORGAN
BY
ATTORNEY.

June 8, 1926.
J. L. MORGAN
CAR AXLE JOURNAL BEARING
Filed June 18, 1923
1,587,735
2 Sheets-Sheet 2
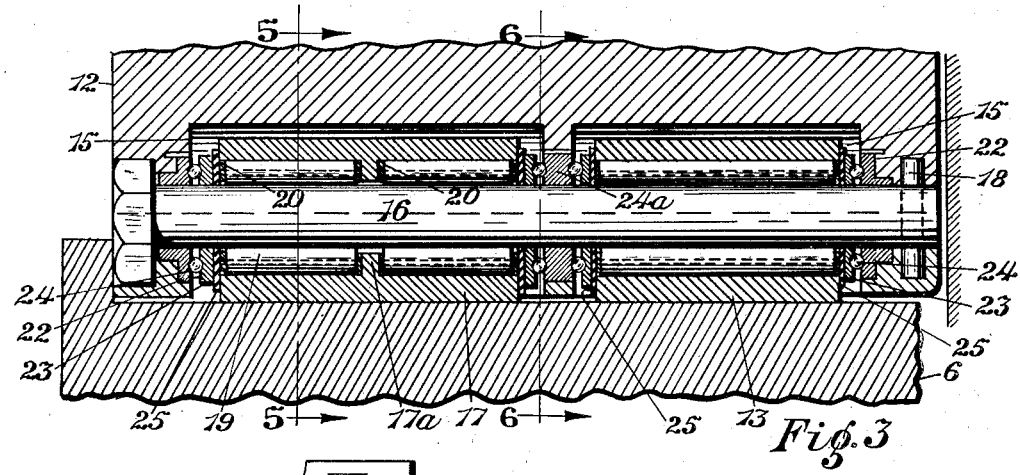
Fig. 3
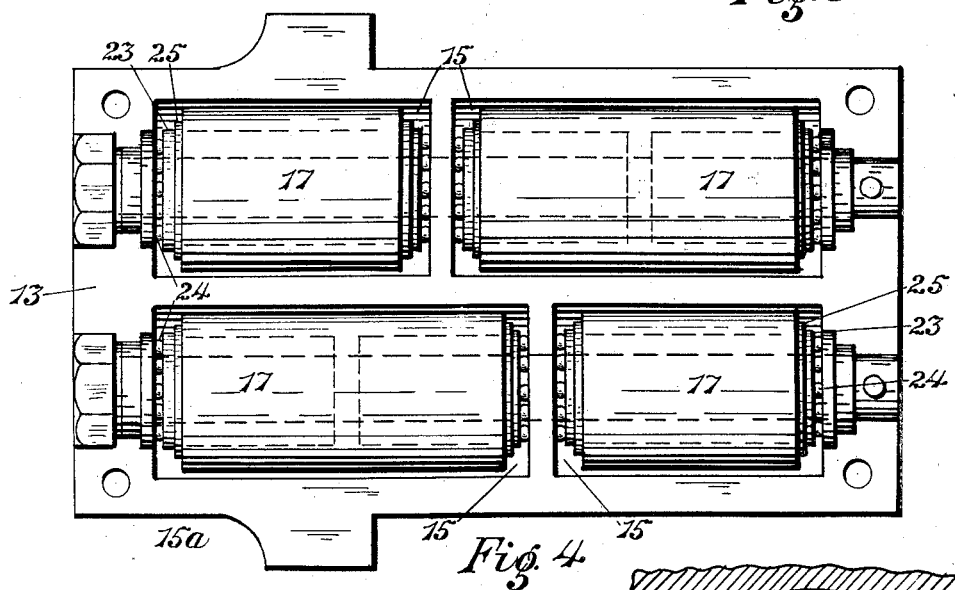
Fig. 4
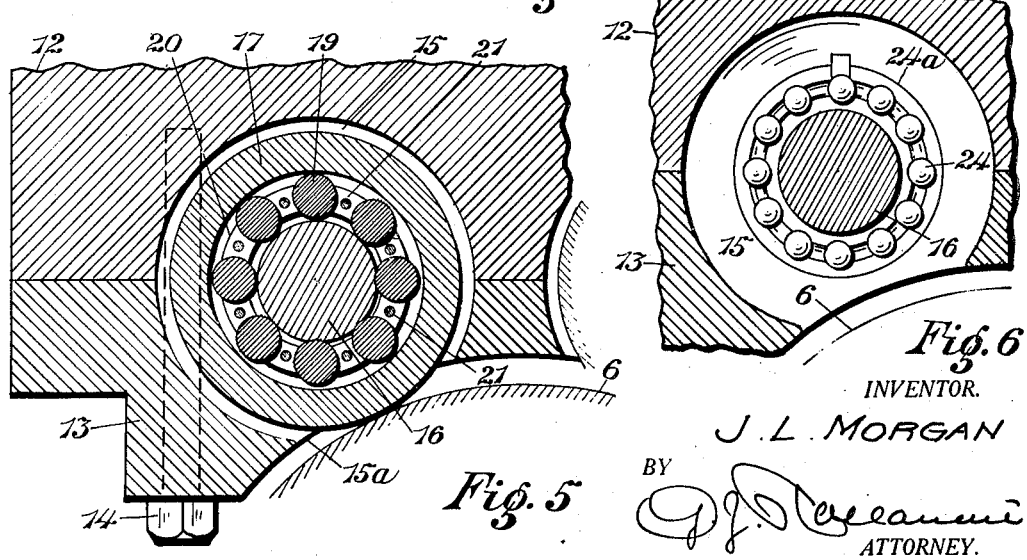
Fig. 5
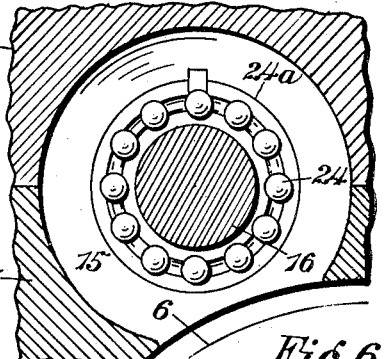
Fig. 6
INVENTOR.
J. L. MORGAN
BY
ATTORNEY.

Patented June 8, 1926.

1,587,735

UNITED STATES PATENT OFFICE.

JOSEPH L. MORGAN, OF DENVER, COLORADO, ASSIGNOR TO GRANBY HILLYER, OF DENVER, COLORADO.

CAR-AXLE JOURNAL BEARING.

Application filed June 12, 1923. Serial No. 645,152.

My invention relates to journal bearings for railway cars and more especially to bearings of the type shown and described in my application for patent Serial No. 638,560, filed May 12th, 1923.

The bearing as disclosed in the application above referred to is of the anti-friction type and comprises in combination with a sectionally constructed body which in form and proportions is similar to the ordinary solid bearings now in general use, a plurality of rollers which project peripherally beyond the lower surface of the body to engage the journal of an axle to which the bearing is applied.

The rollers are arranged on the body in pairs at opposite sides of a central vertical plane passing through the axis of the journal, and they are mounted on anti-friction bearings of either the ball or roller type.

The improvements constituting the subject of the present application reside principally in a novel arrangement of the rollers on the body of the bearing which prevents uneven wear of the journal by lapping the zones of contact of the rollers at one side of the body with those of the rollers at the other side of the same, and in a novel construction of the anti-friction bearings which support the rollers on the body.

An embodiment of my invention has been illustrated in the accompanying drawings in which similar characters of reference designate corresponding parts throughout the several views and in which—

Figure 1:
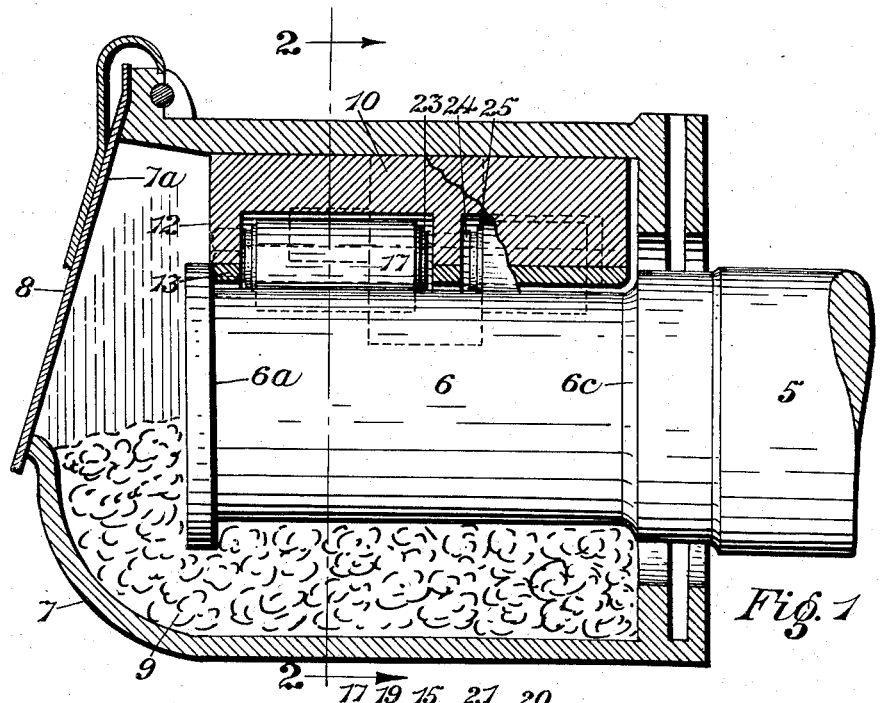
Figure 2:
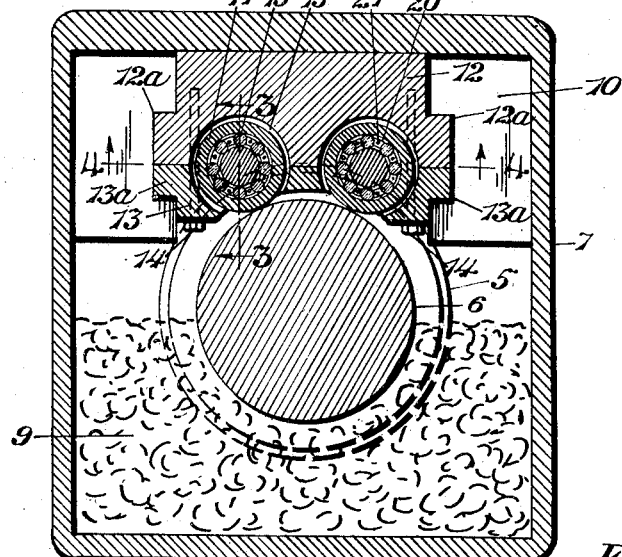

Figure 1 represents a sectional elevation of my improved roller bearing in its operative position relative to an axle journal in the journal box of a railway car;

Figure 2, a cross-section taken in the plane indicated by the line 2—2, in Figure 1;

Figure 3, a section along the line 3—3, Figure 2, drawn to an enlarged scale;

Figure 4, an enlarged bottom view of the upper section of the body of the bearing taken on the line 4—4, Figure 2;

Figure 5, an enlarged fragmentary section taken on the line 5—5, of Figure 3; and Figure 6, a similar section along the line 6—6, Figure 3, Referring more specifically to the drawings, 5 designates the axle of a railway car, having at its end a flanged journal 6 of reduced diameter.

The journal is as usual disposed in a box 7 fastened at a side of the car and provided at its outer end with an opening 7ª which is normally closed by a spring-pressed lid 8.

A mass of absorbent material 9 occupies the lower portion of the box for lubricating purposes, although in the use of a bearing of my improved construction, the application of a lubricant to the journal is not as essential as in bearings of the ordinary type at present in general use.

Lugs 10 on the side walls of the housing determine the position of the bearing relative to the journal as will hereinafter be more fully described.

All of the above described features of construction are common to the journal boxes of railway cars as used at present and they are per se not a part of my invention which relates solely to the journal bearings by which the weight of the car and its load are supported upon the ends of the axles.

My improved bearing comprises a body composed of two sections 12 and 13 which adjoin each other in a horizontal plane and which are rigidly fastened together by means of bolts 14.

The upper section 12 of the body is preferably made of steel or other strong, durable and wear-resisting material, and the lower section 13 is made of brass or other similar composition adapted to reduce friction in the event of accidental contact of the body with the journal of the rotating axle when the bearing is in use.

The two sections have in their adjoining faces complementary parts of cylindrical chambers 15 formed in pairs at opposite sides of the longitudinal axis of the body. The chambers of each pair are axially alined, and the sections of the body are recessed at opposite ends of the chambers to provide seats for the shafts upon which the contact members of the bearing are rotatably supported.

The chambers of each pair are of unequal lengths and they are disposed reversely with relation to those of the other pair, so that the contact members in either pair of chambers will engage the surface of the journal in zones overlapping those of the contact members in the chambers of the other pair and thereby prevent uneven wear of the journal.

The contact members hereinabove referred to consist of hollow cylinders 17 made of hardened steel or other strong and wear-resisting material and proportioned to fit loosely within the respective chambers of the body.

A headed bolt 16 supported in the seats at opposite ends of the chambers of each pair, provides a shaft for the support of anti-friction bearings upon which the rollers are mounted.

The head of each bolt is disposed in a countersink of the seat at an end of the body, and the bolt is held in place by a transverse pin 18 fitted in recesses of the seat at the opposite end of the same.

The anti-friction bearings are composed of a series of rollers 19 equidistantly supported at their ends in rings 20 which are rigidly connected by bolts 21.

The roller bearings occupy the spaces between the shafts 16 and the therewith concentric rollers 17 and they are held against lengthwise displacement between thrust bearings at opposite ends of the rollers.

The thrust bearings are each composed of two complementary ball races 22 and 23 one of which is held against rotation in a recess of the body of the bearing, and a series of balls 24 equidistantly disposed between the races. The fixed member of the thrust bearings at the inner ends of the rolls of each pair, may be common to both as shown at 24ª in Figure 3 of the drawings, and washers 25 made of felt, rubber or other soft material are placed between the thrust bearings and the ends of the rolls and their roller bearings to prevent noise and to provide a certain amount of resiliency which permits of a limited self-adjustment of the parts when the bearing is in operation.

The longer roller of each pair of contact members is preferably strengthened by an internal central rib 17ª which divides the space between the roller and the respective shaft into two compartments each of which contains a roller bearing of the above described construction as shown in Figure 3 of the drawings.

The sectional body of the bearing conforms exteriorly to the solid bearings used heretofore; its lower surface is concaved in conformity with the surface of the journal of the car axle and its chambers have in said surface, openings 15ª through which the contact members protrude for engagement with the journal as shown in Figures 2 and 5.

The length of the body is such that as usual, it fits loosely between the flange 6ª and the shoulder 6ᶜ at opposite ends of the journal, and bosses 12ª and 13ª extending laterally from the two sections of the body contact conjointly with the lugs 10 on the inside of the box to determine the position of the body lengthwise of the journal. The bosses 12ª and 13ª furthermore relieve the bolts 14 from strain by holding the sections of the body against relative displacement.

My improved bearing is readily fitted in its operative position after the old bearing is removed from a journal box, by slightly raising the latter by means of a lifting jack or other suitable appliance, and then inserting the bearing through the opening of the box, into the space between the lugs 10 until its bosses engage therewith.

The body of the bearing engaging at the top of the journal box, is normally spaced from the face of the journal and the two sets of rollers protruding through the openings in its lower, curved surface engage with the journal at opposite sides of the vertical plane of the longitudinal axis thereof.

It will be evident that by the rolling contact of the bearing with the journal along two parallel lines, friction is reduced to the minimum, that the overlapping relation of the circumferential zones of contact of the rollers with the journal prevents uneven wear, and that the anti-friction bearings and the thrust bearings upon and between which the rollers are mounted cooperate to reduce friction without sacrifice of the strength and durability required to maintain the bearing in operative condition under every stress to which it may be subjected in the movement of a railway car to which it is applied.

Having thus described my invention, what I claim and desire to secure by Letters Patent is:

1. A journal bearing comprising, in combination, a body including upper and lower sections respectively having alined long and short recesses and corresponding openings, and said recesses and openings in adjacent rows being arranged in staggered relation, rollers arranged in said recesses and projecting through said openings, and shafts journaled between said sections and having the rollers mounted thereon, and means for keying said shaft to said upper and lower sections.

2. A journal bearing comprising in combination a body including upper and lower sections, shafts mounted between said sections and secured against rotation, and said upper and lower sections being provided with complemental recesses and openings, rollers of different length arranged in staggered relation and projecting through said openings, and two-part anti-friction thrust washers having ball-bearings therebetween mounted on said shafts at each end of said rollers thereby to take up the thrust between said rollers and the sections constituting the body.

In testimony whereof I have affixed my signature.

JOSEPH L. MORGAN.